(12) United States Patent
Van Der Ven et al.

(10) Patent No.: US 11,631,415 B2
(45) Date of Patent: Apr. 18, 2023

(54) METHODS FOR A VOICE PROCESSING SYSTEM

(71) Applicant: SPEAKSEE HOLDING B.V., Rotterdam (NL)

(72) Inventors: Marcellus Wilhelmus Van Der Ven, Rotterdam (NL); Jari Tamas Hazelebach, Rotterdam (NL)

( * ) Notice: Subject to any disclaimer, the term of this patent is extended or adjusted under 35 U.S.C. 154(b) by 0 days.

(21) Appl. No.: 17/259,927

(22) PCT Filed: Jul. 16, 2019

(86) PCT No.: PCT/NL2019/050450
§ 371 (c)(1),
(2) Date: Jan. 12, 2021

(87) PCT Pub. No.: WO2020/017961
PCT Pub. Date: Jan. 23, 2020

(65) Prior Publication Data
US 2021/0295849 A1    Sep. 23, 2021

(30) Foreign Application Priority Data

Jul. 16, 2018 (NL) ..................................... 2021308

(51) Int. Cl.
*G10L 17/22* (2013.01)
*G10L 15/26* (2006.01)
(Continued)

(52) U.S. Cl.
CPC .............. *G10L 17/22* (2013.01); *G10L 15/26* (2013.01); *H04R 3/005* (2013.01); *G10L 2021/02166* (2013.01)

(58) Field of Classification Search
CPC ......... G10L 17/22; G10L 15/26; G10L 17/00; G10L 21/00; G10L 25/06;
(Continued)

(56) References Cited

U.S. PATENT DOCUMENTS

| 8,144,903 B2 | 3/2012 | Haenggi et al. |
| 9,729,994 B1 | 8/2017 | Eddins et al. |
| (Continued) | | |

FOREIGN PATENT DOCUMENTS

| EP | 3057340 A1 | 8/2016 |
| EP | 3101919 A1 | 12/2016 |
| WO | 2015008162 A2 | 1/2015 |

OTHER PUBLICATIONS

International Search Report in related International Patent Application No. PCT/NL2019/050450, dated Oct. 29, 2019, 3 pages.

*Primary Examiner* — Yogeshkumar Patel
(74) *Attorney, Agent, or Firm* — FisherBroyles, LLP

(57) ABSTRACT

Methods for a voice processing system comprising P microphone units (102A . . . 102D) and a central unit (104) are disclosed. Each microphone unit is linked to a person and derives from N microphone signals a source localisation signal. The source localisation signal is used to control an adaptive beam form process to obtain a beam formed audio signal. The microphone unit is further configured to derive metadata from for N microphone signals, such direction the sound is coming from. Packages with the metadata and beam formed audio signal are transmitted to the central unit. The central unit processes the metadata to determine which parts of the P beam formed audio signal comprises speech from a person that is linked to another microphone unit. By removing said parts from the audio signals before transcription, the quality of the transcription is improved. The transcriptions are displayed on a remote device.

16 Claims, 2 Drawing Sheets

(51) Int. Cl.
*H04R 3/00* (2006.01)
*G10L 21/0216* (2013.01)
(58) Field of Classification Search
CPC .......... G10L 2021/02166; H04R 3/005; H04R 29/005; H04R 25/70; H04R 2225/43; H04R 2430/20; H04R 2460/01; H04R 2499/11; H04M 2203/5072; H04M 2203/5081
See application file for complete search history.

(56) References Cited

U.S. PATENT DOCUMENTS

| | | | | |
|---|---|---|---|---|
| 2008/0101635 | A1* | 5/2008 | Dijkstra | H04R 25/70 381/315 |
| 2013/0024196 | A1* | 1/2013 | Ganong, III | H04M 3/569 704/E17.001 |
| 2013/0166299 | A1 | 6/2013 | Shimotani et al. | |
| 2013/0304476 | A1* | 11/2013 | Kim | H04N 7/15 704/270 |
| 2018/0146284 | A1* | 5/2018 | Benattar | H04R 25/407 |

* cited by examiner

METHODS FOR A VOICE PROCESSING SYSTEM

PRIORITY APPLICATIONS

This application is a U. S. National Stage Filing under 35 U.S.C. 371 from International Application No. PCT/NL2019/050450, filed on 16 Jul. 2019 and published as WO 2020/017961 on 23 Jan. 2020, which claims the benefit of priority to Netherlands Patent Application No. 2021308, filed 16 Jul. 2018, which applications and publication are incorporated herein by referenced in their entirety.

TECHNICAL FIELD

The subject disclosure relates to the field of voice processing. More particular the subject disclosure relates to a method in a microphone unit of a voice processing system and a method in a central unit of a voice processing system. Furthermore, the subject disclosure relates to a microphone unit and a central unit of a voice processing comprising P microphone units.

BACKGROUND ART

EP3057340A1 discloses a hearing system comprising a partner microphone unit. The partner microphone comprises a multitude of microphones for picking up a target signal component, i.e. the person's voice, and a noise component, i.e. background sound. From the microphone signals a beam-formed signal is generated, wherein signal components from other directions than a direction of the target signal are attenuated, whereas signal components from the directions of the target signal source are left un-attenuated. The partner microphone comprises further antenna and transceiver circuitry for establishing a wireless audio link to another device, e.g. a hearing aid, headset.

US2002/0150263A1 discloses a signal processing system which receives signals from a number of different sensors which are representative of signals generated from a plurality of sources. The sensed signals are processed to determine the relative position of each of the sources relative to the sensors. This information is then used to separate the signals from each of the sources. The system can be used, for example, to separate the speech signal generated from a number of users in a meeting.

US2015/0154183A1 discloses an auto-translation conferencing system for multi user audio. A translation services server receives over a separate communication channel the audio signals from different devices for translation into textual data. The textual data may be translated into text of different languages based on the language preferences of the end user devices.

In the known systems multiple microphones at fixed positions are used to separate the speech signal generated from a number of users in e.g. a meeting. If the speech signals could not be separate with enough quality, a speech signal assumed to comprise only voice of a first speaker could also comprise voice of other speakers. When the first speaker is listening to another speaker, the voice of another speaker could become dominant in the speech signal. When the speech signal is supplied to a translation service, the translated speech signal comprises both text spoken by the first speaker and the other speaker. Furthermore, when the users are not at a fixed position and could move around in the room, it would be hard to obtain a good speech signal of the person moving around.

SUMMARY OF INVENTION

It is an object of the present technology to provide a voice processing system for processing simultaneously voice of multiple persons in a conversation which has at least one of the advantages over the known voice processing systems: improved sound quality of the individual speaker, not limited to speakers at fixed positions, improved signals to be supplied to translation services, reduced crosstalk of speakers in audio channel of a speaker, flexible in use, scalable with respect to number of users, simultaneous translation of more than one conversation in a single room, reduced power consumption.

According to the subject technology, this object is achieved by a method in a microphone unit having the features of claim 1 and a method in a central unit having the features of claim 11. Advantageous embodiments and further ways of carrying out the present technology may be attained by the measures mentioned in the dependent claims.

According to a first aspect of the subject technology, there is provided a method in a microphone unit of a voice processing system comprising P microphone units and a central unit. The microphone unit retrieves from N input units $Mic\_i$, $i=1, 2, \ldots N$, $N \geq 2$, N microphone signals having a sampling frequency $SF1$, each microphone signal comprising a target signal component and a noise signal component. The unit determines from the N microphone signals a source localisation signal having a sampling frequency $SF3$, wherein $SF1 \geq SF3$. The unit derives from a group of Y consecutive samples of the source localisation signal a beam form control signal. Under control of the beam form control signal the unit generates a group of Y consecutive samples of a beam formed audio signal having a sampling frequency $SF2$ from the N microphone signals, wherein $SF1 \geq SF2 \geq SF3$. The unit derives a set of metadata for the group of Y consecutive samples of the beam formed audio signal from corresponding samples of the N microphone signals from which the group of Y consecutive samples of the beam formed audio signal has been obtained. The unit further generates data packages and streams wirelessly the data packages to the central unit of the voice processing system. Each data package comprises Q groups of Y consecutive samples of the beam formed audio signal and Q sets of metadata derived for Q groups of Y consecutive samples from corresponding samples of the N microphone signals.

There is further provided a method in the central unit. The central unit receives wirelessly P streams of data packages from P microphone units. Each data package comprises Q groups of Y consecutive samples of a beam formed audio signal and Q sets of metadata corresponding to Q groups of Y consecutive samples of the beam formed audio signal. The central unit time synchronizes the data packages of the P streams to obtain P synchronized streams of data packages. The central unit detects in each of the P synchronized streams based on the beam formed audio signals and time corresponding metadata which parts of the P beam formed audio signals comprises a target signal component of an active speaker linked to the microphone unit which generated said stream and forwards the detected parts of the beam formed audio signals of the P streams for further processing.

The present technology is based on the insight that for a good transcription of speech of a conversation into text, it is important that each person taking part of the conversation is clearly identified in and isolated from the captured audio signals by the microphones of the voice processing system. The term 'microphone unit' in the subject technology is to be understood in relation to a user wearing the 'microphone unit' and which speech has to be processed for reproduction and/or transcription. The microphone unit is preferably attached to the person. Even though the microphone unit is placed relatively close to the sound source of interest (the mouth of the wearer), the target-signal-to-noise ratio of the signal picked up by the microphone may still be less than desired, for example due to back ground noise or other persons who speak very loudly. Beam forming is used to improve the target-signal-to-noise ratio of each microphone unit. However, it is still possible that the voice of a person who speaks very loudly has enough amplitude in the beam formed audio signal transmitted by the microphone unit such that it is recognized as speech by a transcription engine. In that case, the transcription of the audio signal from the microphone unit results in text coming from the user wearing the microphone unit and at least one other loudly speaking person. By generating set of metadata from the N microphones of a microphone unit which provides information about the assumed audio source linked to the microphone unit which could not be derived from the beam formed audio signal from said microphone unit, the central unit will be able to combine content of sets of the meta data from all microphone units to improve detection of which parts of the received beam formed audio signal from the P microphone units comprises speech of the person associated with the microphone unit and which parts probably do not comprises speech of said person. According to the present technology, the metadata comprises at least information that is derived from a combination of the N microphones signals of the microphone unit and which could not be derived from the beam formed audio signal at the output of the microphone unit. For example a field of a set of metadata could indicate from which direction the sound is coming from or could indicate whether more than a predefined percentage of Y consecutive samples is coming from a direction falling within a range defined by used the used beam-shaping algorithm. For example, when the metadata indicates that a part of the beam formed audio signal from a particular microphone unit probably does not comprise target sound, the central unit could verify whether the metadata of any other time corresponding parts of the received beam formed audio signals from the other microphone units comprises target sound. If this is the case, it is very likely that said part of the audio signal from the particular microphone unit does not comprise speech from the person associated with said microphone unit, as a general rule in conversations is that only one person is speaking at a time. This identified part could subsequently be removed or attenuated before for example transcription of the audio signal.

In an embodiment, a value of a first metadata field is derived from a group of Y consecutive samples of the source localisation signal. Normally, a microphone unit attached to the cloth of a person will receive sound from said person from a particular direction resulting in a corresponding value of the source localisation signal. When the sound is coming from another direction, the source localisation signal will have a value significantly differing from the value in case the linked person is speaking. This is an indication that the sound is from another source and that it should probably be removed from the audio stream before transcription to text. The central unit could use this information to start a verification process to verify whether another microphone unit had received earlier the same speech of said person. If that is the case, the corresponding part of the beamed formed audio signal could be removed before transcription of the speech into text.

In an embodiment of the subject technology, the sets of metadata and Q groups of Y consecutive samples of the beam formed audio signal that have been derived from a corresponding part in time of the N microphone signals are included in a $i^{th}$ data package and $i+T^{th}$ data package respectively, wherein T is an integer greater than 0. In this embodiment the metadata is transmitted some time in advance of the corresponding beam formed audio signal. It has been found that for a good transcription of speech it is advantageous to have some milliseconds of background noise before the speech in the audio signal. If the first word of speech starts with a plosive phoneme, for example the phoneme of the letters p, t, k, b and d in Dutch and said phonemes is not preceded by background noise, said letter is regularly missed in the text of the transcript of the audio signal, which is not the case when having some background noise in advance of a plosive phoneme. Furthermore, the central unit could benefit from these features as it could start analysis of the metadata of other audio signals in advance of receiving the part of the audio signal comprising speech and will therefore be able to minimize the throughput time from receiving the beam formed audio signal and forwarding the audio signal for further processing.

In an embodiment of the subject disclosure, a sample of the source localisation signal has a value indicating the direction from which is estimated that the target signal component is coming from; the microphone unit determines the number of samples from the Y consecutive samples of the source localisation signal that have a value in a range defined by the beam form control signal. If the number is larger than a predefined threshold value, the microphone unit inserts in a set of the metadata a second field with a value indicating the corresponding Y consecutive samples of the beam formed audio signal comprises target sound. In another embodiment, the number is included in a field of a set of metadata.

In an embodiment of the subject disclosure, streaming of data packages is started when the metadata of a package indicates that the time corresponding Y consecutive samples of the beam formed audio signal comprises target sound. This feature enables to reduce the power consumption of the microphone unit by switching on the transceiver at moments that the audio signal is expected to comprise speech. In a further embodiment, streaming of data packages is stopped after at least T data packages comprising metadata indicating that the corresponding Q groups of Y consecutive samples of the beam formed audio signal does not comprise target sound. This feature improves the quality of the transcription and enables to reduce the power consumption of the microphone unit and thereby extend the operating time on one battery charge.

In an embodiment of the subject disclosure, the central unit generates for each of the P microphone units a streaming control signal based on the beam formed audio signals and time corresponding metadata and transmits the streaming control signals to the P microphone units. The microphone unit receives from the central unit a streaming control signal and stops streaming data packages in response to the streaming control signal. This feature enables to further reduce power consumption of a microphone unit.

In an embodiment of the subject disclosure, a set of metadata comprises for each of the Y consecutive samples of the beam formed audio signal a field having a value derived from the corresponding samples of the source localisation signal. Having the direction from which the audio is coming from for each group of Y consecutive samples, enables the central unit to improve the decision whether a group of Y consecutive samples of a microphone unit comprises speech of the person associated with said microphone unit.

In an embodiment, the method in the microphone unit determines a speaker voice profile from the N microphone signals and verifies if the speaker voice profile corresponds to a microphone reference speaker voice profile. When the speaker voice profile corresponds to the microphone reference speaker voice profile, the microphone unit start streaming the data packages. In a further embodiment, the microphone reference speaker voice profile is received from the central unit. These features enables to reduces the power consumption for transmitting packages by starting only when the voice in the beam formed audio signal is likely to come from the speaker wearing the microphone unit.

According to a second aspect of the subject technology there is provided a microphone unit and a central unit having a processor and a memory to store instructions that, when executed by the processor, cause the microphone unit and central unit to perform corresponding methods descript above.

Other features and advantages will become apparent from the following detailed description, taken in conjunction with the accompanying drawings which illustrate, by way of example, various features of embodiments.

BRIEF DESCRIPTION OF THE DRAWINGS

These and other aspects, properties and advantages will be explained hereinafter based on the following description with reference to the drawings, wherein like reference numerals denote like or comparable parts, and in which.

DESCRIPTION OF EMBODIMENTS

The advantages, and other features of the technology disclosed herein, will become more readily apparent to those having ordinary skill in the art from the following detailed description of certain preferred embodiments taken in conjunction with the drawings which set forth representative embodiments of the present technology.

Figure 1:
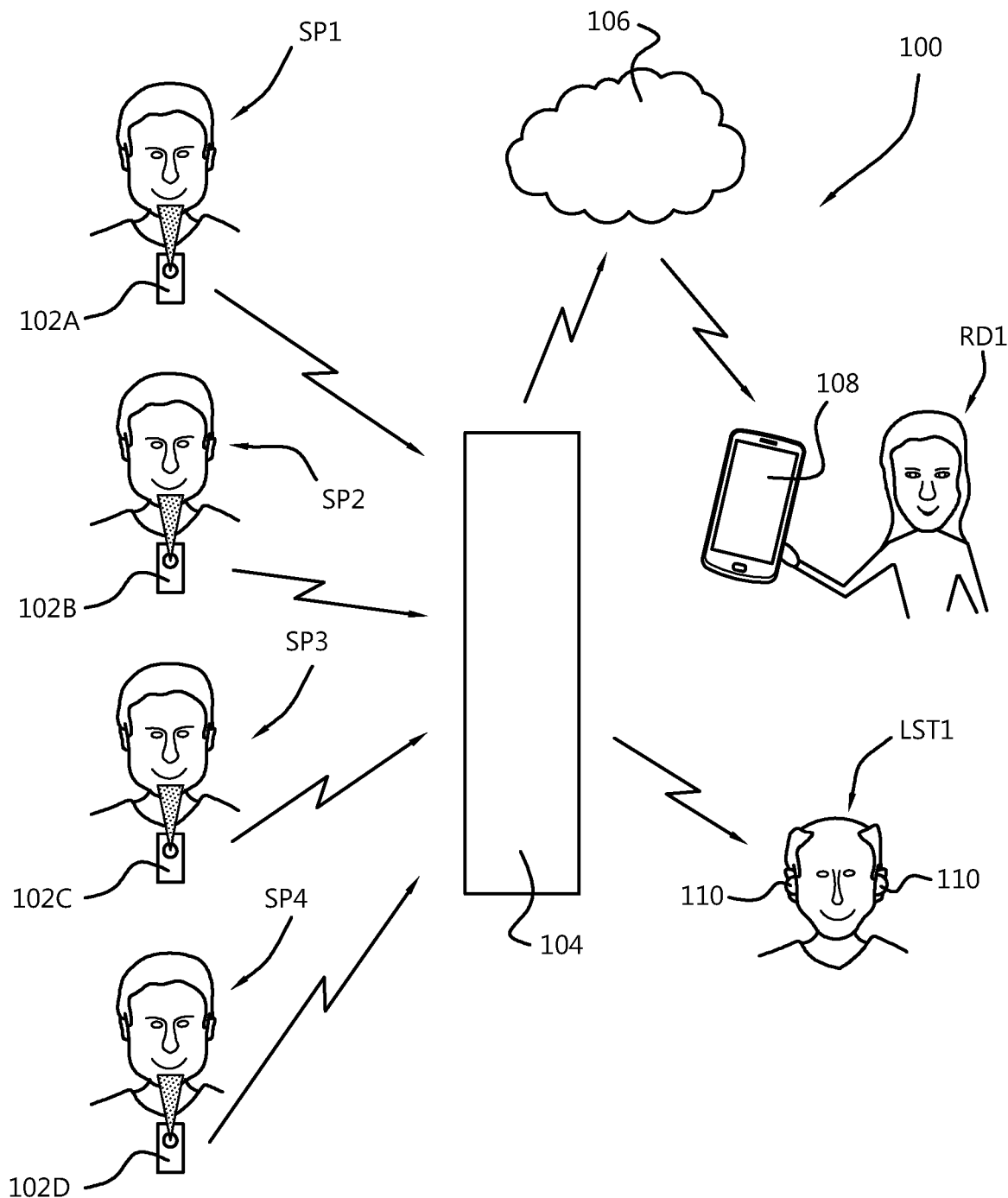
FIG. 1 shows schematically a voice processing system according to the present technology.

FIG. 1 shows schematically an embodiment of a voice processing system 100 according the present subject technology. The voice processing system comprises a multitude of microphone unit's 102A-102D, a central unit 104, a transcription server in the cloud 106, a mobile device 108 and a hearing aid 110. Each microphone unit 102A-102D is attached to a speaking person SP1-SP4 taking part of a conversation. A microphone unit is configured for picking up sound and generating an audio signal to be wirelessly transmitted to the central unit 104. The audio signal comprises a target signal component and a noise signal component, wherein the target signal component is coming from the speaking person that wears the microphone unit and the noise component is all the other sound in the audio signal, e.g. ambient noise and sound of loud speaking person. Placing a wireless microphone close to a sound source of interest makes communication in challenging environments easier. The microphone unit transforms the sound captured by its microphones in to a digital audio signal that can be wirelessly transmitted to the central unit 104. Any digital transmission protocol can be used to communicate wirelessly with the central unit. Examples of transmission protocols are, but not limited to: WIFI, DECT, and Bluetooth.

The central unit 104 receives the digital audio signals from the P microphone unit 102A-102D connected to the central unit 104. The central unit 104 simultaneously processes the digital audio signals to remove speech parts from a digital audio signal from a microphone unit which are not coming from the person using said microphone unit and optionally to remove some noise from each of the P digital audio signals to obtain P quality improved digital audio signals. The P quality improved digital audio signals are transmitted over the internet to a transcription service 106. The transcription service 106 is configured to transcript the P quality improved digital audio signals into text and to send said text to one or more remote display devices 108, such as but not limited to: mobile phones, tablets, laptops, desktops, smart TVs. An app running on the remote display devices 108 is configured to display the text as a conversation on it screen to enable a reader RD1 to follow the conversation by reading the text.

An app running on the remote display devices 108 enables a user to link the device to a specific central unit. An on-line communication service handles user requests to link the central unit and routes the text obtained by transcription of the P quality improved audio signals corresponding to the P microphone units coupled to the central unit via the internet to the remote display devices linked to said central unit. The transcription service 106 and communication service may run on the same server or on different servers in the cloud.

Optionally, the central unit 104 is configured to combine the P quality improved digital audio signals to a combined audio signal for transmission to one or more head phones or hearing aids 110 worn by a person LST1 with for example a hearing impairment. With this embodiment, the speech of each person taking part of a conversation is optimized to be reproduced by the hearing aid. For example, the loudness of the different speaking persons may be equalized and/or the frequency spectrum of each person may be adapted such that a person with a hearing impairment is capable to follow the conversation by listening.

Figure 2:
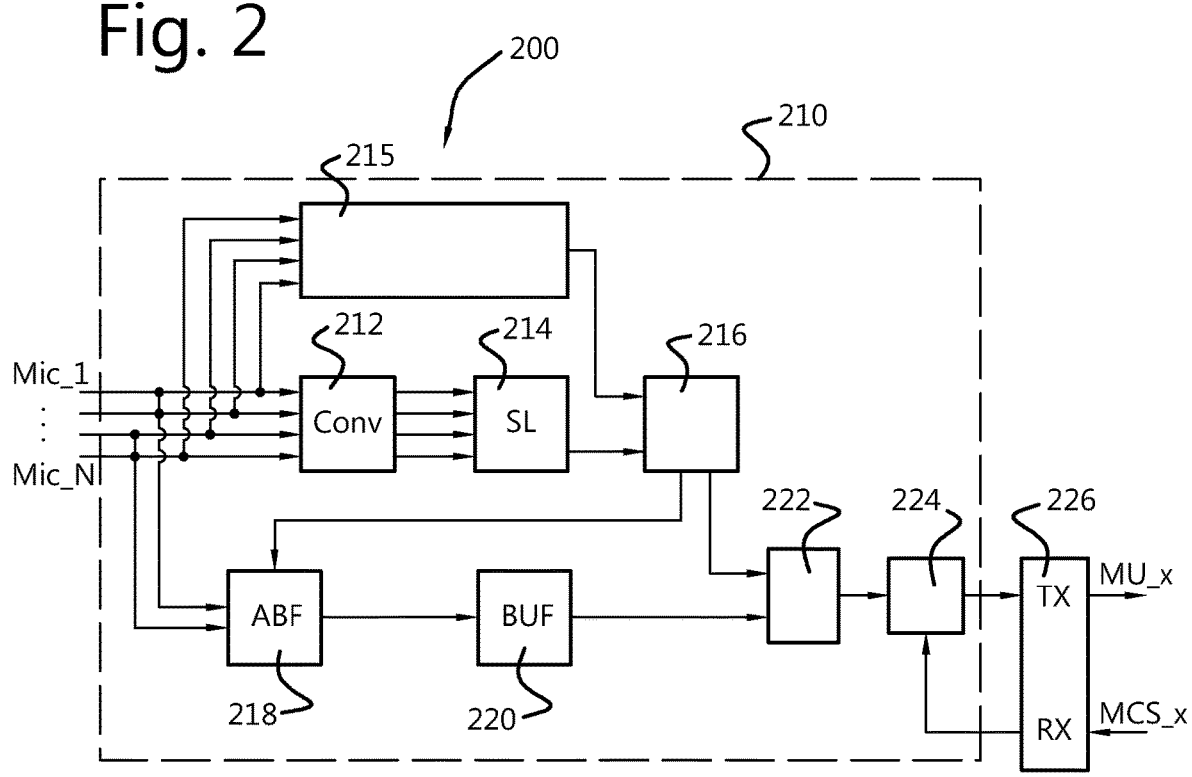
FIG. 2 shows schematically an embodiment of a microphone unit.

FIG. 2 shows schematically an embodiment of a microphone unit 200. The microphone unit 200 comprises N microphones Mic_1 ... Mic_N, a processor 210 and a transceiver 226. A microphone is a transducer that converts sound into an electrical signal. In the present embodiment each microphone generates a PDM signal with a sample frequency SF1 of 2048 kHz. PDM or Pulse dense modulation is a form of modulation used to represent an analog signal with a binary signal. The PDM signals are supplied to inputs of the processor 210. The N microphones are omnidirectional microphones located at some distance from each other to enable detection from which direction the audio is coming from.

The processor 210 receives the PDM signals. A conversion function 212 converts the 1-bit PDM signals from the N microphones to corresponding N 16-bit Pulse-code modulation (PCM) signals with a sampling frequency SF2 of 16 kHz. The conversion unit 212 comprises a decimation filter to enable down sampling of the audio signals without losing information in the audio signals to detect from which direction target sound is coming from.

A source localisation function 214 derives a source localisation signal from the N 16-bit PCM signals obtained from the conversion unit 212. A value of the source localisation signal is calculated from 16 subsequent samples the N 16 bit PCM signals and corresponds to the direction the main signal component in the 16 subsequent samples is coming from. The source localisation signal has a sampling frequency SF3 of 1 kHz. In another embodiment, the source localisation signal includes a signal indicating the direction of the target sound coming from and the distance between the target source and the microphone unit.

Block 216 is an algorithm to calculate a beam form control signal from the source localisation signal. In an embodiment, the algorithm performs a low-pass filter function to obtain a relative slowly changing beam form control signal. In another embodiment, the algorithm determine from a specified number of subsequent samples of the source localisation the direction which occurs most often and uses this direction to generate the corresponding value of the beam form control signal.

The beam form control signal controls an adaptive beam filter process 218. In an embodiment, the adaptive beam filter process 218 is configured to select two of the N microphone signals under control of the beam form control signal to obtain a 16 bit beam formed audio signal having a sampling frequency of 16 kHz from said two microphone signals. Said two microphone signals correspond to the two microphones having the largest distance from each other in the direction of the target sound indicated by the beam form control signal. As the distance between the two selected microphones is known, the assumed direction of the target sound and the speed of sound in air, it is possible to combine the two audio signals such that the target sound is amplified and noise is attenuated. When the distance between target source and microphone unit and direction of target sound are used by the adaptive beam filter the signal quality of the beam formed audio signal could be improved. It should be noted that beam forming is a commonly known technology. As the beam formed audio signal will be submitted to a transcription engine, the adaptive beam filter process performs optionally a normalisation filter. Normalisation of a speech signal improves the quality of the transcription process as the loudness of each speech part will be substantially the same.

The 16 kHz samples of the beam formed audio signal are supplied to a First-In First-Out (FIFO) buffer 220. The FIFO buffer 220 has a buffer size of Y×T samples, wherein Y and T are integers with a value larger than 0.

Block 216 further represents the generation of a set of metadata for a group of Y subsequent samples of the beam formed audio signal. The set of metadata is derived from corresponding samples of the N microphone signal from which the group of Y consecutive samples of the beam formed audio signal has been obtained. In an embodiment, a first metadata field is derived from a group of Y consecutive samples of the source localisation signal. In an embodiment, Y=16. This means that one first metadata field is generated each millisecond. In an embodiment, a sample of the source localisation signal has a value indicating the direction from which is estimated that the target signal component is coming from and block 216 determines the number of samples from the Y consecutive samples of the source localisation signal that have a value in a range defined by the beam form control signal. If the number is larger than a predefined threshold value, block 216 generates a set of metadata with a second field with a value indicating that the corresponding Y consecutive samples of the beam formed audio signal comprises target sound. How this metadata is used in the central unit 104 will be described below.

Block 222 represents a function which generates data packages comprising Q groups of Y consecutive samples of the beam formed audio signal and Q sets of metadata, wherein a set of metadata is obtained for a group of Y consecutive samples of the beam formed audio signal. Due to the buffer 220 having a size of Y×T samples, an $i^{th}$ data package comprises a set of meta data that have been derived from a part of the microphone signals Mic with a length of Y/SF2 second which is T×Y/SF2 seconds in time before the part of the microphone signals that has been used to obtain the group of Y consecutive samples of the beam formed audio signal. In other words: the Q sets of metadata and Q groups of Y consecutive samples of the beam formed audio signal that have been derived from substantially the same part in time of the N microphone signals are included in a $i^{th}$ data package and i+$T^{th}$ data package respectively. An advantage that the sets of metadata derived from a part in time of the N microphone signals Mic_1 . . . Mic_N arrives at the packaging function some time before the correspond group of Y consecutive samples of the beam formed audio derived from the same part in time of the N microphone signals is that when starting streaming of the data packages due to the detection of voice, the stream of data packages starts with a defined minimal number of groups of Y consecutive samples of the beam formed audio signal which comprises no voice. It has been found when transcription speech, the transcription improves when the speech is preceded by a time period without speech. The buffer 220 enables this.

Block 224 controls the streaming of the data packages to the central unit. If the metadata indicates for a predetermined time that the beam formed audio signal does not comprise speech, the streaming of data packages is stopped to reduce power consumption by bringing the transceiver 226 in low power mode. In an embodiment, as soon as the metadata indicates that the coming groups of Y consecutive samples of the beam formed audio signal comprises speech, the transceiver will become in transmission mode and will start transmission of the data packages. Transceiver 226, e.g. a WIFI transceiver, is configured to stream wirelessly the data packages MU_x to the central unit 104. Index x indicates the index number of the microphone unit. In an embodiment, an internet protocol is used to communicate with the central unit. To reduce overhead in the communication, UDP (User Datagram Protocol) can be used. It might be clear to the skilled person that each communication protocol that has enough bandwidth to transmit the data packages might be used.

Optionally, the transceiver 226 is configured to receive a microphone control signal MCS_x from the central unit. In an embodiment, the microphone control signal comprises a stop command. When the function in block 224 detects the stop command, the streaming of data packages is stopped and the transceiver 226 is switched in low power mode. In an embodiment, the microphone control signal further carries a reference speaker voice profile. The reference speaker voice profile for a microphone unit is obtained by analysing the beam formed audio signal from said microphone unit which is transmitted to a transcription engine. The mel-frequency cepstrum (MFC) is a possible format for a speaker profile. However any other suitable format could be used to characterize voice of a person.

In an embodiment, the microphone unit comprises functionality to determine from the beam formed audio signal or microphone signals Mic_1 . . . Mic_N an actual speaker profile. The microphone unit is further configured to verify whether the actual speaker profile corresponds to the reference speaker voice profile retrieved from the microphone control signal MCS_X received from the central unit. If there is a more than a predefined degree of similarity between the actual speaker profile and the reference speaker voice profile, the transmission of data packages could be started by the microphone unit. In this way, when the central unit detects by processing the P streams of data packages from the P microphone units that the stream of microphone unit MU_x comprises speech from a person other than the person wearing the microphone unit, the central unit stops streaming of data packages by a microphone unit MU_x by sending the stop signal in the Microphone Control Signal MCS_x to said microphone unit MU_x. As soon as the Microphone unit MU_x detects that the reference speaker voice profile has a predefined degree of similarity, said microphone unit MU_x will start streaming of the data packages again. In this way, the power consumption of the microphone unit could be reduced further.

Block 215 performs one or more functions to derive special characteristics from the N PDM signals coming from the microphones. The special characteristics have a property that could not accurately be derived from the beam formed audio signal that will be transmitted to the central unit for further processing and transcription. Examples of such special characteristics are not limited to: maximum Signal to Noise Ratio (SNR) of the microphone signals Mic_1-Mic_N, signal power (dB) of the microphone signals Mic_1-Mic_N, etc. The derived special characteristics are transmitted in fields of a set of metadata to the central unit. The derived special characteristics enables the central unit to determine more accurately which parts of the streamed beam formed audio signal from a particular microphone unit do not comprise speech from the speaker associated with said particular microphone. By removing these parts before transcription, the quality of the transcription could be improved.

Figure 3:
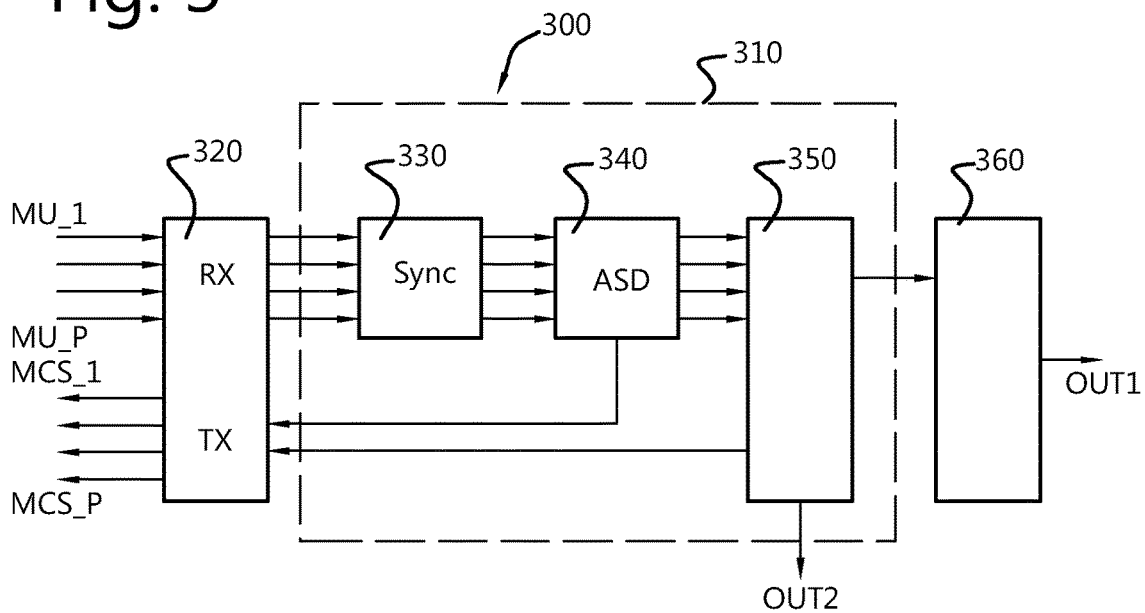
FIG. 3 shows schematically an embodiment of a central unit.

FIG. 3 shows schematically an embodiment of a central unit 300. The central unit 300 comprises a first transceiver 320, a signal processor 310 and a second transceiver 360. The first transceiver 320, e.g. a WIFI receiver, is configured to communicate simultaneously with the P microphone units 102A ... 102D of the voice processing system 100 in FIG. 1. The signals from the P microphones units MU_1 ... MU_P comprises for each microphone unit MU_i a stream of data packages. The stream of data packages may be a continuous stream of data packages or non-continuous stream of data packages. The transceiver forwards the P streams to a synchronization process 330. As the internet protocol is used for communication, the arrival time at the central unit 300 of a data package from a first microphone unit MU_1 corresponding to a particular moment in time does not necessarily have the same arrival time at the central unit of a data package from a second microphone MU_2. The synchronization process 330 uses time stamps in the data packages to align the streams of data packages in time and forwards P time synchronized streams from the microphone units to an automatic speech detection process 340. Technology for time synchronizing data is commonly known to the skilled person and therefor this is not descripted in more detail.

The automatic speech detection process 340 is configured to process the time synchronized sets of metadata of the P microphone units. As described above the metadata of a microphone unit MU_i comprises at least one data field with characteristics or features derived from the N microphone signals Mic_1 ... Mic_N which could not be derived from the beam formed audio signal of said microphone unit MU_1. An example of such a characteristic is the determined angle from which the target sound is coming from. Another example is a field indicating the minimal Signal to Noise Ration of a part of the N microphone signals time corresponding to a group of Y consecutive sample of the beam formed audio signal. Another example is a field with a value indicating that the corresponding Y consecutive samples of the beam formed audio signal comprises target sound which value is derived from the source localisation signal. In still another embodiment, the last or first sample of the source localisation signal corresponding a group of Y consecutive beam formed audio samples is stored in a data field of a set of metadata.

By combining the content of the set of metadata it is possible to determine that some parts of the streamed beam formed audio signal do not comprise speech of the person to which the microphone is assigned. For example, normally as a rule in a conversation one person is speaking at a time. However, when one person changes his voice from a normal volume to a loud volume, next to the microphone unit that is worn by said person, another microphone unit could pick up his voice and could incorrectly conclude that this is voice from the person wearing the other microphone and starts streaming the speech of the loud speaking person to the central unit. As the sound is coming from another direction than the target sound is normally coming from, the central unit could detect this in the metadata of the another microphone and as normally as a rule not two persons are speaking at the same time, the automatic speech detection process will detect this constellation and will remove the corresponding data packages from the stream of the other microphone to obtain for each microphone unit is reduced stream of data packages. The decision algorithm could be improved by taking into account known or calculated distance between the microphone and the speed of sound in air. Similarly, the signal power corresponding to a group of Y consecutive samples of the beam formed audio signal and Signal to noise ratio might be used to improve detection whether or not the audio in a data package in the stream of a particular microphone unit MU_i comprise speech from the person associated with said microphone unit.

In an embodiment, when the automatic speech detection process 340 detects that a data stream from a microphone unit carries speech from another person wearing another microphone unit, the process 340 generates a stop command for said microphone unit and supplies the stop command to the transceiver 320 for transmission to the corresponding microphone unit. In response to the stop command, the microphone unit switches its transceiver in low power mode to reduce power consumption. The stop command is submitted as part of the microphone control signal. The automatic speech detection process 340 supplies the P reduced streams of data packages to a further processing process 350. In an embodiment, the further processing process 350 is configured to determine for each of the P microphone unit from the beam formed audio signal in the data packages of the P reduced streams a reference speaker voice profile. The reference speaker voice profile for microphone unit MU_i is supplied to the transceiver 320 for submission to the corresponding microphone unit MU_i as part of the microphone control signal MSC_i. The microphone unit MU_i might use the reference speaker voice profile to compare a speaker profile derived from the N microphone PDM signals. If there is enough similarity, the streaming control process 224, activates the transceiver into transmission mode and starts transmission of the data packages.

The further processing process 350 is further configured to stream the beam formed audio signals of the reduced stream of the P microphone units to an in the cloud multi speaker transcription engine via transceiver 360 with an internet protocol. In an embodiment the transceiver 360 uses an UDP protocol. The multi speaker transcription engine is configured to receive the beam formed audio signals of the reduced streams, to transcript separately each of the beam formed audio signals into text and to transmit the text such that the text can be displayed on a display of a remote device as a conversation wherein on the display is indicated for each part of the text an indication of the audio source. An indication of the audio source might be a microphone index number, name assigned to a microphone unit, unique name for each speaker, etc. In an embodiment a reader RD1 could get the transcription by accessing a webpage via a unique URL assigned to the conversation. New text of transcribed speech will be pushed to all devices that are linked to said transcription by accessing the URL. The transcribed speech can be displayed as webpage or by an app running on the device.

The further processing process 350 is optionally configured to combine the beam formed audio signals of the reduced stream of the P microphone units to a combined audio signal OUT2 that can be transmitted to an audio system, headphone or hearing aid 110 such that people LST1 can follow the conversation by listening. In this embodiment, the parts of the beam formed audio signal that have been removed by the automatic speech detection process will not be included in the combined audio signal. In this way echo cancelation is applied.

A microphone unit for use in a voice processing system described above comprises N microphones generating N microphone signals having a first sampling frequency SF1, a wireless communication unit, a processor and a memory to store instructions that, when executed by the processor, cause the microphone unit to perform any of the methods for a microphone unit described above.

A central unit for use in a voice processing system described above comprises a wireless communication unit configured to communicate with each of the P microphone units, a processor and a memory to store instructions that, when executed by the processor, cause the central unit to perform any of the method for a microphone unit described above.

It should be noted that it might be possible to include the transcription engine function in the central unit 104. This would make the system a stand-alone system. However this requires a lot of local processing power making the system unnecessary expensive.

In the subject disclosure, sample frequencies of 2048 kHz, 16 kHz and 1 kHz have been used as exemplary embodiments. The use of other sample frequencies will not change the concept of the subject disclosure.

The present subject disclosure describes a computer implemented method in a microphone unit and a central unit. The central unit might be in the form of a dedicated hardware unit with a processor comprising instructions when executed cause the processor to perform the method. However, the central unit might also be implemented in a mobile device such as but not limited to: smartphone, tablet and laptop.

The subject disclosure transcribing a conversation between two or more persons in the same room is very useful for persons with a hearing loss, that are hearing impaired, deaf and/or hard-of-hearing. They could follow the conversation by reading. The subject disclosure can also be applied for transcribing meetings and could replace a note taker, secretary or translator. The latter is possible when automatically a translation is made of the transcribed text from the spoken language to another language.

While the invention has been described in terms of several embodiments, it is contemplated that alternatives, modifications, permutations and equivalents thereof will become apparent to those skilled in the art upon reading the specification and upon study of the drawings. The invention is not limited to the illustrated embodiments. Changes can be made without departing from the scope which is defined by the appended claims.

The invention claimed is:

1. A method in a microphone unit of a voice processing system comprising P microphone units and a central unit, the method comprising:

retrieving from N input units Mic_i=1, 2, . . . N, N≥2, N microphone signals having a sampling frequency SF1, each microphone signal comprising a target signal component and a noise signal component;

determining from the N microphone signals a source localisation signal having a sampling frequency SF3, wherein SF1≥SF3;

deriving from a group of Y consecutive samples of the source localisation signal a beam form control signal;

generating under control of the beam form control signal a group of Y consecutive samples of a beam formed audio signal having a sampling frequency SF2 from the N microphone signals, wherein SF1≥SF2≥SF3;

deriving a set of metadata for the group of Y consecutive samples of the beam formed audio signal from corresponding samples of the N microphone signals from which the group of Y consecutive samples of the beam formed audio signal has been obtained, wherein the metadata comprises for each of the Y consecutive samples of the beam formed audio signal a third field having a value derived from the corresponding samples of the source localisation signal;

generating data packages, a data package comprising Q groups of Y consecutive samples of the beam formed audio signal and Q sets of metadata, wherein Q≥1;

streaming wirelessly the data packages to the central unit.

2. The method according to claim 1, wherein a value of a first metadata field is derived from a group of Y consecutive samples of the source localisation signal.

3. The method according to claim 1, wherein the sets of metadata and Q groups of Y consecutive samples of the beam formed audio signal that have been derived from a corresponding part in time of the N microphone signals are included in a $i^{th}$ data package and i+$T^{th}$ data package respectively, wherein T is an integer greater than 0.

4. The method according to any of claim 1, wherein a sample of the source localisation signal has a value indicating the direction from which is estimated that the target signal component is coming from; the method further comprises:

determining the number of samples from the Y consecutive samples of the source localisation signal that have a value in a range defined by the beam form control signal;

and if the number is larger than a predefined threshold value, inserting in a second field of the metadata with a value indicating that the corresponding Y consecutive samples of the beam formed audio signal comprises target sound.

5. The method according to claim 4, wherein streaming of data packages is started when a set of the metadata of a package indicates that the corresponding Y consecutive samples of the beam formed audio signal comprises target sound.

6. The method according to claim 5 in conjunction with claim 3, wherein streaming of data packages is stopped after at least T data packages comprises metadata with the second field indicating that the corresponding Y consecutive samples of the beam formed audio signal does not comprise target sound.

7. The method according to claim 1, the method comprises:
   determining a speaker voice profile from the N microphone signals;
   verifying if the speaker voice profile corresponds to a microphone reference speaker voice profile; and
   start streaming the data packages when the speaker voice profile corresponds to the microphone reference speaker voice profile.

8. The method according to claim 1, wherein the method further comprises:
   receiving from the central unit the microphone reference speaker voice profile.

9. The method according to claim 1, wherein the method further comprises:
   receiving from the central unit a microphone control signal;
   stop streaming data packages in response to the microphone control signal.

10. A method in a central unit of a voice processing system comprising P microphone units executing the method according to claim 1, the method comprising:
    receiving wirelessly P streams of data packages from the P microphone units, each data package comprises Q groups of Y consecutive samples of a beam formed audio signal and Q sets of metadata corresponding to Q groups of Y consecutive samples of the beam formed audio signal;
    time synchronizing the data packages of the P streams to obtain P synchronized streams of data packages;
    detecting in each of the P synchronized streams which parts of the beam formed audio signals comprises a target signal component of an active speaker linked to the microphone unit which generated said stream based on the beam formed audio signals and time corresponding sets of metadata;
    forwarding the detected parts of the beam formed audio signals of the P streams for further processing.

11. The method according to claim 10, wherein the metadata in the $i^{th}$ data package corresponds to the beam formed audio signal in the $i+T^{th}$ data package, where T is an integer greater than 0.

12. The method according to claim 10, further comprising:
    generating for each of the P microphone units a microphone control signal based on the beam formed audio signals and time corresponding sets of metadata;
    transmitting the microphone control signals to the P microphone units.

13. The method according to claim 10, further comprising:
    obtaining a speaker voice profile for each of the P microphone units;
    transmitting the speaker voice profile of microphone unit MU_x to microphone unit MU_x as reference speaker voice profile.

14. The method according to claim 1, wherein the set of metadata comprises at least one field representing a characteristic taken from a group comprising: target source location, SNR, DB, voice detected.

15. Microphone unit for use in a voice processing system comprising P microphone units and a central unit, the microphone unit comprises N microphones generating microphone signals having a first sampling frequency SF1, a wireless communication unit, a processor and a memory to store instructions that, when executed by the processor, cause the microphone unit to perform the method according to claim 1.

16. A central unit for use in a voice processing system comprising P microphone units, the central unit comprising a wireless communication unit configured to communicate with each of the P microphone units, a processor and a memory to store instructions that, when executed by the processor, cause the central unit to perform the method according to claim 10.

* * * * *

UNITED STATES PATENT AND TRADEMARK OFFICE
CERTIFICATE OF CORRECTION

| | |
|---|---|
| PATENT NO. | : 11,631,415 B2 |
| APPLICATION NO. | : 17/259927 |
| DATED | : April 18, 2023 |
| INVENTOR(S) | : Van Der Ven et al. |

It is certified that error appears in the above-identified patent and that said Letters Patent is hereby corrected as shown below:

In the Claims

Column 12, Line 11, Claim 1, the portion of the formula reading:
-Mic_i=1-
Should read:
--Mic_i, i=1,--

Signed and Sealed this
Twenty-third Day of May, 2023

*Katherine Kelly Vidal*

Katherine Kelly Vidal
*Director of the United States Patent and Trademark Office*